United States Patent [19]
Jylhä et al.

[11] Patent Number: 5,793,800
[45] Date of Patent: Aug. 11, 1998

[54] METHOD AND APPARATUS FOR MINIMIZING PHASE ERROR IN A TRANSMITTER SECTION OF A TRANSCEIVER

[75] Inventors: Raimo Jylhä; Mika Kähkölä; Jukka-Pekka Neitiniemi, all of Oulu, Finland

[73] Assignee: Nokia Telecommunications Oy, Espoo, Finland

[21] Appl. No.: 491,993

[22] PCT Filed: Nov. 16, 1994

[86] PCT No.: PCT/FI94/00515

§ 371 Date: Jul. 18, 1995

§ 102(e) Date: Jul. 18, 1995

[87] PCT Pub. No.: WO95/14334

PCT Pub. Date: May 26, 1995

[30] Foreign Application Priority Data

Nov. 18, 1993 [FI] Finland ................. 935120

[51] Int. Cl.$^6$ ................. H04B 7/01; H04B 1/38
[52] U.S. Cl. ................. 375/219; 375/226; 375/227; 375/296; 375/308; 455/126
[58] Field of Search ................. 375/216, 213–221, 375/226–227, 279–281, 284–285, 296, 308; 455/67.4, 126; 330/149; 332/103–105

[56] References Cited

U.S. PATENT DOCUMENTS

| | | | |
|---|---|---|---|
| 4,291,277 | 9/1981 | Davis et al. | 330/149 |
| 4,462,001 | 7/1984 | Girard | 330/149 |
| 4,700,151 | 10/1987 | Nagata | 332/123 |
| 5,066,922 | 11/1991 | Leitch | 330/51 |
| 5,066,923 | 11/1991 | Gailus et al. | 330/107 |
| 5,212,814 | 5/1993 | Iwane | 455/107 |
| 5,351,016 | 9/1994 | Dent | 332/103 |
| 5,381,108 | 1/1995 | Whitmarsh et al. | 455/126 X |
| 5,396,196 | 3/1995 | Blodgett | 332/103 |
| 5,404,378 | 4/1995 | Kimura | 375/296 |
| 5,469,105 | 11/1995 | Sparks | 330/129 |
| 5,483,681 | 1/1996 | Bergsten et al. | 455/126 |
| 5,507,017 | 4/1996 | Whitmarsh et al. | 455/126 |
| 5,574,994 | 11/1996 | Huang et al. | 455/126 |

FOREIGN PATENT DOCUMENTS

| | | |
|---|---|---|
| 0473373 | 3/1992 | European Pat. Off. . |
| 0496621 | 7/1992 | European Pat. Off. . |

*Primary Examiner*—Young T. Tse
*Attorney, Agent, or Firm*—IP Group of Pillsbury Madison & Sutro LLP

[57] ABSTRACT

A method and transceiver unit for minimizing the phase error of the transmitter of the transceiver unit, in which, to enable simple and quick adjustment of the phase error, a predetermined test signal is applied via a delay to the input of the transmitter section of the transceiver unit. The output signal of the transmitter section is converted to the receive-frequency of the receiver of the transceiver unit. The receive-frequency signal is applied to the receiver of the transceiver unit. The output signal of the receiver is compared to the predetermined test signal, and the delay is adjusted on the basis of the result of the comparison so that the phase error of the transmitter is minimized.

8 Claims, 1 Drawing Sheet

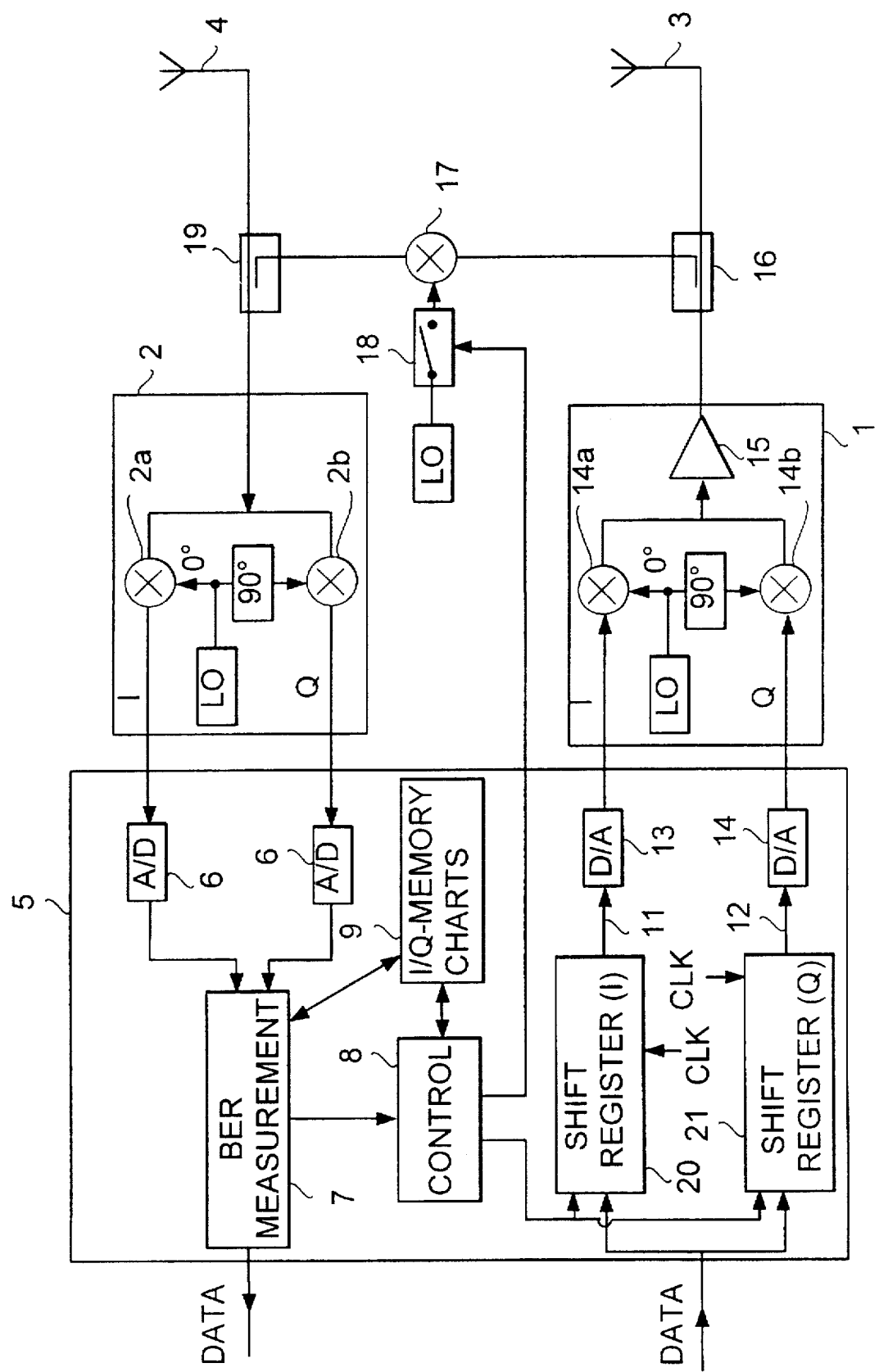

METHOD AND APPARATUS FOR MINIMIZING PHASE ERROR IN A TRANSMITTER SECTION OF A TRANSCEIVER

BACKGROUND OF THE INVENTION

The present invention relates to a method for minimizing the phase error of a transmitter of a transceiver unit. The invention also relates to a transceiver unit for transmitting and receiving signals, this unit comprising a transmitter, a receiver and antenna means for establishing a radio contact with active radio units currently located in the coverage area of the transceiver unit.

A transceiver unit refers in this context to a unit which comprises both a radio receiver and a radio transmitter. The present invention relates particularly to adjusting the phase error of the transmitter of a transmitter unit, this adjustment being carried out, as known, unit-specifically in connection with the manufacture of the unit. The practice has however shown that a phase error due to the component tolerances of a transmitter will not remain constant but changes unit-specifically as the transmitter ages, whereby it is necessary to readjust the transmitter separately for each unit. Since this operation requires the presence of maintenance staff, it is rather expensive in addition to taking up a lot of time, during which time the transceiver unit cannot be used for normal traffic operation.

SUMMARY OF THE INVENTION

The object of the invention is to solve the abovementioned problem, and to provide a method by means of which the adjustment of the phase error of a transceiver unit can be performed in a significantly simpler and quicker manner than before. These objects are achieved with the method of the invention, characterized in that a predetermined test signal is applied via a delay means to the input of the transmitter section of the transceiver unit; the output signal of the transmitter section is converted to the receive frequency of the receiver; the receive-frequency signal is applied to the receiver of the transceiver unit; the output signal of the receiver is compared to the predetermined test signal; and the delay means is adjusted on the basis of the result of the comparison in such a manner that the phase error of the transmitter is minimized.

The invention also relates to a transceiver unit in which the method of the invention can be applied. The transceiver unit of the invention is characterized in that the unit comprises a memory means, in which test data is stored; a delay means, which is connected to the input of the transmitter and via which data is applied to the transmitter; a mixing means for converting a test signal, which is applied by the transmitter and generated from the test data stored in the memory means, from a transmit frequency to a receive frequency, the output of the mixing means being connected so as to apply the receive-frequency test signal to the input of the receiver; and a control means for applying the test data stored in the memory means via the delay means to the transmitter of the unit, for comparing the output signal of the receiver to the test data stored in the memory means, and for adjusting the delay means on the basis of the abovementioned comparison so that the difference between the output signal and the stored test data is minimized.

The invention is based on the idea that the transceiver unit is provided with means by which the phase error of the transmitter can be automatically adjusted without this requiring any special maintenance operations. The most significant advantages of the method and the transceiver unit of the invention are thus that it is not necessary to separately adjust the phase error of the transceiver unit at the manufacturing stage, which facilitates the process of manufacture of the unit, and that the ageing of the unit does not affect the phase error, because the phase error can be continuously adjusted by means of the automatic adjusting means located in the transceiver unit.

In a preferred embodiment of the transceiver unit of the invention, the unit comprises means for transmitting two signals by using quadrature modulation. The minimization of the phase error of the transmitter can thus be carried out by varying the mutual phase shift of the signals to be transmitted. This means that a sufficient adjustment can be performed as one of the signals to be transmitted passes through the controllable delay means.

BRIEF DESCRIPTION OF THE DRAWING

The invention will be described in more detail in the following by means of one of its preferred embodiments with reference to the accompanying figure, which shows a block diagram of a preferred embodiment of the transceiver unit of the invention.

DETAILED DESCRIPTION

The figure shows the transceiver unit of a base station operating in a FDMA/TDMA-type (Frequency Division Multiple Access/Time Division Multiple Access) frequency and time division system, such as the GSM system, this tranceiver unit being able by means of antennas 3 and 4 to establish a radio contact with the active radio units currently located in the radio coverage area of the base station. The structure and operation of the GSM system are described for instance in "The GSM System for Mobile Communications", M. Mouly & M-B Pautet, Palaiseau, France, 1992, ISBN: 2-95071900-0-7, wherefore they are not further described here.

The transceiver unit shown in the figure comprises means by which it is capable of automatically testing the phase error of its transmitter 1 by means of a loop integrated in the unit. This type of loop is integrated in each transceiver unit used in the base station.

When an operating voltage is connected to the unit or the unit is brought to a special test state, the operation of control logic 8 included in the baseband section 5 of the unit causes the test data stored in a memory 9 to be applied to the input of the transmitter 1. Since the transmitter unit shown in the figure comprises means for transmitting two signals (I and Q) in a manner known as such by using quadrature modulation, the operation of the control logic 8 causes the test signal to be applied to a shift register 20 and 21 of both an I-branch 11 and a Q-branch 12, respectively. A clock pulse CLK is also applied to the shift registers 20 and 21, as is apparent from the figure. The signals obtained from the outputs of the shift registers 20 and 21 are applied via D/A converters 14 located in the branches 11 and 12 to mixers 14a and 14b located in the transmitter 1, in which mixers a quadrature modulation is performed on the test signals by utilizing an oscillator LO. When the signals of the I-branch and the Q-branch are combined and converted to the transmit frequency of the transmitter 1, the signal to be transmitted is amplified at an output stage 15.

A mixer 17 is connected to the output of the transmitter 1 via a directional coupler 16. In the mixer, the test signal is converted to a receive frequency by means of the oscillator LO operating during the test period, this oscillator being controlled by the control unit 8 by means of an RF switch 18.

A directional coupler 19 is connected to the output of the mixer 17, and the receive-frequency signal is applied via the coupler to the input of a receiver 2. The receiver 2 demodulates the signal applied to it to the I- and Q-branches by utilizing the oscillator LO and mixers 2a and 2b, after which the output signal of the receiver 2 is applied via A/D converters 6 located in the baseband section 5 of the unit to a measuring unit 7, which carries out the comparison of the received test signal with the test data stored in the memory means 9, and calculates the bit error rate (BER) as a result of this comparison.

If the bit error rate resulting from the calculation exceeds a predetermined set value, the control means 8 adjusts the delay caused by either the shift register 20 or the shift register 21 to the propagation of the signal in such a manner that the phase difference between the signals applied via the I-branch 11 and the Q-branch 12 changes, whereby the entire phase error of the transmitter 1 changes. A sufficient change in the phase error of the transmitter can thus be produced by adjusting only one of the shift registers 20 and 21. This change in the phase difference may in practice be carried out by steps of ±0.5°, for instance, the phase difference being however preferably no more than about ±5°. After this, the above-mentioned test period is repeated until the calculated bit error rate reaches the predetermined set value, whereby those "delay values" of the shift registers 20 and 21 at which the phase error of the transmitter 1 is at its minimum are stored in the memory chart 9.

During normal traffic use, the data transmitted by the transmitter unit passes via the shift registers 20 and 21, whereby these shift registers cause delays according to the values stored in the memory chart 9 to occur in the I-branch and/or Q-branch by the operation of the control unit 8.

The accompanying figure and the description relating to it are only intended to illustrate a preferred embodiment of the transceiver unit of the invention without restricting the invention. In its details, the method and the transceiver unit of the invention can vary within the scope of the appended claims. Even though the invention has been described above primarily as part of the FDMA/TDMA radio system, it will be apparent that the method and the transceiver unit of the invention can also be utilized in other types of radio systems.

We claim:

1. A method for minimizing the phase error of a transmitter of a transceiver unit having a transmitter section having an output signal and a receiver section having a receive-frequency comprising the steps of:

generating a test signal from test data;

applying said test signal in a test period via a delay-provider to the input of the transmitter section of the transceiver unit;

converting the output signal of the transmitter section to the receive frequency of the receiver section as a receive-frequency signal;

applying the receive-frequency signal to the receiver section of the transceiver unit;

comparing an output signal of the receiver section to said test data; and adjusting the delay-provider on the basis of the result of said comparing to minimize the phase error of the transmitter section.

2. A method according to claim 1, wherein said comparing of the output signal of the receiver and said test data comprises:

carrying out said comparing by calculating a bit error rate; and said adjusting includes adjusting the delay-provider to minimize the bit error rate.

3. A transceiver unit for transmitting and receiving signals, said unit comprising:

a transmitter having an input;

a receiver having an input and an output signal; and antenna means;

said transmitter, said receiver and said antenna means being operatively associated for establishing a radio contact with active radio units currently located in a coverage area of the transceiver unit;

a memory means having test data stored therein;

a delay means which is connected to the input of the transmitter and arranged to apply a test signal generated from said test data to the transmitter;

a mixing means for converting a signal, which is outputted by the transmitter and generated from said test data stored in the memory means, from a transmit frequency to a receive frequency, the mixing means having an output connected so as to apply said signal outputted by the transmitter to the input of the receiver; and a control means arranged for generating said test signal and for applying said test signal via the delay means to the transmitter, for comparing the output signal of the receiver to said test data stored in the memory means to provide a comparison, and for adjusting the delay means on the basis of said comparison to minimize the difference between said output signal and said test data.

4. A transceiver unit according to claim 3, wherein:

said control means is arranged to carry out said comparison by calculating the bit error rate between the output signal of the receiver and said test data stored in the memory means.

5. A transceiver unit according to claim 3, wherein:

said transceiver unit is a transceiver unit of a TDMA/FDMA system; and said memory means is arranged in a frame unit of a baseband section of said transceiver unit.

6. A transceiver unit according to claim 3, wherein:

said transmitter comprises an input for receiving two signals and means for transmitting said two signals by using quadrature modulation; and said control means includes means for minimizing the phase error of the transmitter by adjusting the phase difference between said two signals by using said delay means to minimize the difference between said output signal and said stored test data.

7. A transceiver unit according to claim 6, wherein:

said delay means is arranged to vary the phase difference between said two signals about ±5°.

8. A transceiver unit according to claim 3, wherein:

said delay means comprises at least one shift register arranged to shift the phase in steps of about 0.5°.

* * * * *